Dec. 28, 1965 W. J. MAHONEY 3,226,698

MAGNETIC MEMORY CIRCUIT

Filed May 18, 1961 2 Sheets-Sheet 1

INVENTOR
WILLIAM J. MAHONEY

BY Stewart F. Moore

ATTORNEY

INVENTOR
WILLIAM J. MAHONEY
BY Stewart F. Moore
ATTORNEY 3,226,698

MAGNETIC MEMORY CIRCUIT

William James Mahoney, Darien, Conn., assignor to American Machine & Foundry Company, a corporation of New Jersey Filed May 18, 1961, Ser. No. 111,035
11 Claims. (Cl. 340—174)

This invention relates to electrical apparatus and more particularly to apparatus wherein switching is accomplished primarily by solid state devices rather than by relays or the like employing moving contacts.

In recent years, there has been an active demand for electrical apparatus capable of accomplishing switching functions without employing moving contacts. One such required switching function occurs where a train of input pulses, such as may be developed by successive switch closings, is to develop an output advancing according to a certain progression. A simple example of such a progression is the binary progression wherein only two independent outputs are present. A first input pulse produces a signal on one output, a second input pulse produces a signal on the other output, a third pulse produces a signal on the first output, etc.

An object of the present invention is to provide improved electrical apparatus for accomplishing primary switching functions without employing relays or the like moving contact devices.

Another object is to provide an improved electrical apparatus for accomplishing primary switching functions of the type where the output advances according to a certain progression when input pulses are received.

Still another object is to provide an electrical apparatus employing transfluxors as primary switching devices and transistors to control the primary switching devices in a manner to accomplish a binary switching function.

A further object is to provide an improved transistor control circuit to operate a pair of transfluxors in a binary fashion.

In order that the manner in which these and other objects are attained in accordance with the invention can be understood in detail, reference is had to the accompanying drawings, which form a part of this specification, and wherein.

In essence, the present invention employs primary switching devices, such as transfluxors, which are of the type producing an output when "on" and providing no substantial output when "off." If the binary progression is desired, a pair of transfluxors are interconnected so that while one is "on" the other is "off." A control transistor is connected to each of the transfluxors and is operative to turn on its respective transfluxor. The control transistor is also connected to receive the output signal from one of the transfluxors, and uses this signal to inhibit operation of the control transistor of the other transfluxor. With such an arrangement, only one of the transistors, is operative at any predetermined time. A pulse applied simultaneously to both control circuits causes only one of the control transistors to turn its respective transfluxor "on" which in turn turns off the other transfluxor and makes the other control transistor operative. Accordingly, each pulse applied causes an alternative transfluxor to be turned on and binary operation is achieved.

Figure 1:
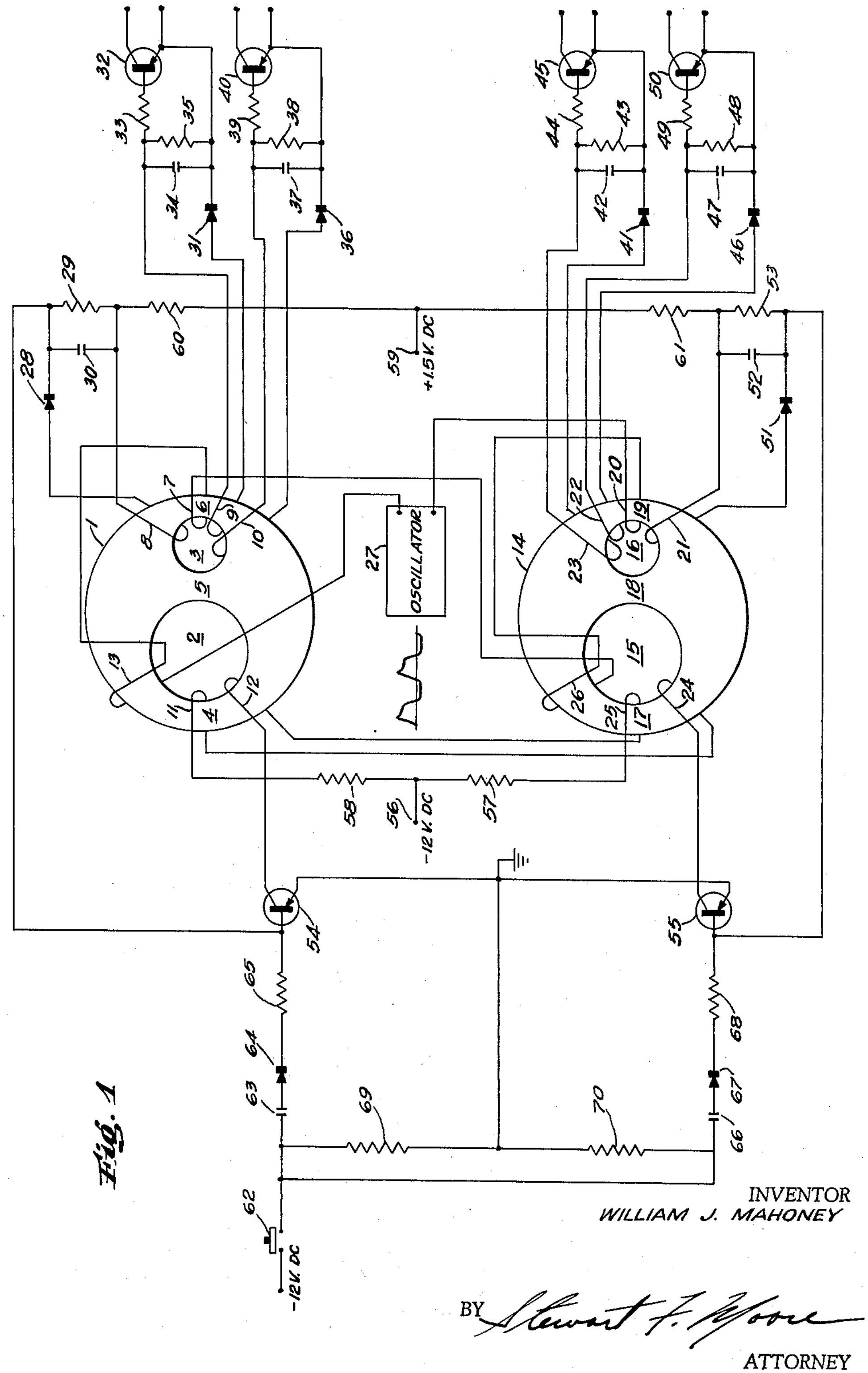
FIG. 1 is a schematic diagram of a binary switching device according to a first embodiment of the present invention.

The primary switching devices employed in one illustrative embodiment, as shown in FIG. 1, are transfluxors of the type described more fully in copending application Serial Number 85,763, filed Jan. 30, 1961, by William J. Mahoney. A first transfluxor includes a magnetic core 1 of a material having a substantially rectangular hysteresis loop, the core being provided with a main aperture 2 and a coupling aperture 3. Apertures 2 and 3 define legs 4, 5 and 6 in the core. The core provides a first magnetic path which surrounds main aperture 2 and includes legs 4, 5 and 6. The core also provides a second magnetic path which surrounds coupling aperture 3 and includes legs 5 and 6, so that legs 5 and 6 are common to both magnetic paths. A primary winding 7 and secondary windings 8, 9 and 10 are wound about legs 6 and pass through the coupling aperture. Control windings, namely reset winding 11 and set winding 12, and an auxiliary winding, namely series winding 13, are wound about leg 4 and pass through the main aperture. Series winding 13 is connected in series with primary winding 7 and is so wound that, when the primary winding is so energized as to produce a flux directed clockwise about coupling aperture 3, winding 13 produces a flux directed counterclockwise about main aperture 2.

A second transfluxor includes a magnetic core 14 of a material having a substantially rectangular hysteresis loop, the core being provided with a main aperture 15 and a coupling aperture 16. These apertures define legs 17, 18 and 19. A first magnetic path surrounds main aperture 15, and a second magnetic path surrounds coupling aperture 16, with legs 18 and 19 being common to both paths. A primary winding 20 and secondary windings 21, 22 and 23 are wound about leg 19 passing through the coupling aperture. A set winding 24 and a reset winding 25 acting as control windings and a series winding 26 are wound about leg 17 passing through the main aperture. Series winding 26 is connected in series with winding 20 and is so wound that, when the primary winding is energized to produce a flux directed clockwise around coupling aperture 16, winding 26 produces a flux directed counterclockwise about main aperture 15.

Primary winding 7 and primary winding 20 are serially connected to a source of asychronous signals, as provided by oscillator 27. The purpose of the transfluxors is to selectively establish coupling between the primary winding and the secondary windings. When the transfluxors are in the "off" condition, referred to as the blocked state, no substantial signal can be induced in the secondary windings. When the transfluxors are in the "on" condition, referred to as the set state, pulses applied to the primary winding induce pulses in the secondary windings. The pulses of one polarity are larger than those of the other polarity since the signal applied to the primary windings is asynchronous.

Connected in series across secondary winding 8 are a diode 28 and a resistor 29. Diode 28 is poled in a direction to permit the larger pulses to pass and develop a direct current potential across resistor 29. A capacitor 30 connected across resistor 29 bypasses ripple components of the signal developed across resistor 29.

Connected across secondary winding 9 is the series combination of a diode 31, the emitter-base circuit of a PNP transistor 32 and a resistor 33. Diode 31 is poled in a direction which permits the larger pulses to pass through transistor 32 and render it conductive. The emitter-to-collector circuit of transistor 32 is connected to a suitable source of potential and load resistance, not shown. Resistor 33 limits the emitter-to-base current of transistor 32. Capacitor 34, connected across transistor 32, bypasses ripple components appearing in the signal applied to transistor 32. Resistor 35, connected across the emitter-to-base circuit of transistor 32, is employed to increase temperature stabilization.

Diode 36, capacitor 37, resistor 38, resistor 39 and a PNP transistor 40, are connected, and operated, in substantially the same manner as the corresponding components connected across secondary winding 9. Diode 41, capacitor 42, resistor 43, resistor 44 and a PNP transistor 45 are connected across secondary winding 29 and are connected, and operated, in substnatially the same manner as the corresponding components connected across secondary winding 9. Diode 46, capacitor 47, resistor 48, resistor 49 and a PNP transistor 50 are connected across secondary winding 22 and are connected, and operated, in substantially the same manner as the corresponding components connected across secondary winding 9. Diode 51, capacitor 52 and resistor 53 are connected across secondary winding 21 and are connected, and operated, in substantially the same manner as components connected across secondary winding 8.

Whenever magnetic core 1 is in the set state, a direct current potential is developed across resistor 29 and transistors 32 and 40 are rendered conductive. When magnetic core 1 is in the blocked state, there is no potential developed across resistor 29, and transistors 32 and 40 are nonconductive. When magnetic core 14 is in the set state, a direct current potential is developed across resistor 53 and transistors 45 and 50 are rendered conductive. When magnetic core 14 is in the blocked state, there is no potential developed across resistor 53 and transistors 45 and 50 are nonconductive.

The operative state of the transfluxors, i.e., the blocked or set state, is determined by PNP transistors 54 and 55 acting as control for their respective transfluxors. Connected to the negative 12-volt D.C. source 56, is the series circuit including resistor 57, reset winding 25, set winding 12 and the emitter-collector circuit of transistor 54. Also connected to negative 12-volt D.C. source 56 is the series circuit including resistor 58, reset winding 11, set winding 24 and the emitter-collector circuit of transistor 55.

When connected in this manner and energized, reset winding 11 produces a reset flux directed in a clockwise direction about main aperture 2. The reset flux is sufficient to saturate legs 5 and 6 in the upward direction, thus blocking the core. When a drive pulse is present, i.e., the large positive portion of the asynchronous signal developed by oscillator 27, primary winding 7 produces flux directed clockwise about coupling aperture 3 and series winding 13 produces flux directed counterclockwise about main aperture 2. The drive pulse fluxes combine in leg 5 in the upper direction and oppose one another in leg 6. Since the core is blocked with legs 5, 6 saturated in the upward direction, the fluxes produced by the drive pulse are ineffective to bring about any change and therefore the core remains blocked. During a prime pulse, e.g., the small negative portion of the asynchronous signal developed by oscillator 27, the fluxes developed combine in leg 5 in the downward direction. However, the magnitude of the prime pulse is so limited that these fluxes are not effective to change the direction of saturation in leg 5. When the core is blocked, there is no coupling between the primary and secondary windings, since flux induced by the primary winding in a clockwise direction around the coupling aperture cannot flow because leg 5 is saturated in this direction, and flux similarly induced in the counterclockwise direction cannot flow because leg 6 is saturated in this direction.

Set winding 12 is so connected that, when energized, it brings about the set state in the transfluxor. When energized, set winding 12 produces flux directed clockwise about the main aperture and saturates legs 5, 6 in the downward direction. A subsequent drive pulse produces fluxes which combine in the upward direction in leg 5 and are sufficient when combined to change the direction of saturation in leg 5. Since leg 6 is now saturated in the downward direction and leg 5 is saturated in the upward direction, there is no opposition to flux flowing counterclockwise about the coupling aperture. Thus, flux and subsequent flux reversals are therefore permitted. Accordingly, the core becomes set and coupling exists between primary winding 7 and the respective secondary windings 8, 9 and 10, permitting pulses to be induced in these secondary windings.

The transfluxor comprising magnetic core 14 operates essentially the same as that comprising magnetic core 1. When reset winding 25 is energized the core is placed in the blocked state and no pulses are induced in secondary windings 21, 22 and 23. When set winding 24 is energized the core changes to the set state and pulses are then induced in the secondary windings.

The set and reset windings of magnetic core 1 are interconnected with the set and reset windings of magnetic core 14 in a manner which permits one core to be placed in the set state when the other core is placed in the blocked state. For example, if transistor 54 is rendered conductive, current flows from ground through transistor 54, set winding 12, reset winding 25 and current limiting resistor 57 to the −12 volt D.C. source 56. This current flow is effective to place magnetic core 1 in the set state and magnetic core 14 in the blocked state. When transistor 55 is rendered conductive, current flows from ground through transistor 55, set winding 24, reset winding 11 and current limiting resistor 58 to the −12 volt D.C. source. Accordingly, when transistor 55 is conductive, magnetic core 14 is placed in the set state and magnetic core 1 is placed in the blocked state.

Reverse "off" bias for transistor 54 is developed by the +1.5 volts D.C. potential source 59 and potential developed across resistor 29. If magnetic core 1 is in the blocked state, no potential is developed across resistor 29. Accordingly, only a +1.5 volt "off" bias appears on the base of transistor 54. If magnetic core 1 is in the set state, a potential is developed across resistor 29 which may, for example, be in the order of 3 volts. This potential is series additive with a +1.5 volt potential and therefore a +4.5 volts "off" bias potential appears on the base of transistor 54. Resistor 60 limits current flow when transistor 54 becomes conductive. Bias for transistor 55 is similarly developed by +1.5 D.C. potential source 59 and the potential developed across resistor 53. Resistor 61 limits current flow when transistor 55 is conductive. Accordingly, the control transistors 54 and 55 have a bias of +1.5 volts when their respective magnetic core is blocked and a bias of +4.5 volts when their respective magnetic cores are set.

The source of random input pulses to which the apparatus is to respond is connected to the bases of transistors 54 and 55. For example, the input pulses may be developed by successive closing of switch 62. When switch 62 is closed, capacitor 63 is charged by current flow through the series circuit which includes the base-emitter circuit of transistor 54, resistor 65, diode 64 and capacitor 63. Simultaneously, the closure of switch 62 permits capacitor 66 to be charged through the series circuit including the emitter-base circuit of transistor 55, resistor 68, diode 67 and capacitor 66. Resistors 65 and 68 form a voltage divider with the emitter-to-base resistance of the respective transistors 54 and 55, and are of a predetermined resistance value as to provide a potential between −1.5 and −4.5 volts on the base of their respective transistors when capacitors 63 and 66 are charged subsequent to the closing of switch 62. If a transistor is biased with +1.5 volts, the bias is overcome, placing a negative potential on the base and rendering the transistor conductive. If, however, the base of the transistor is biased with +4.5 volts, this bias cannot be overcome by the incoming signal and the transistor is not rendered conductive. Accordingly, the transistor biased with +1.5 volts is operative in response to incoming pulses. The transistor biased with +4.5, however, is inoperative with respect to incoming pulses and therefore may be considered as inhibited.

Capacitor 63 is discharged between successive pulses in the series discharge circuit including the back resistance of diode 64, resistor 65, the base-to-emitter resistance of transistor 54 and resistor 69. Capacitor 66 is discharged between successive pulses throught the discharge circuit including the back resistance of diode 67, resistor 68, and base-to-emitter resistance of transistor 55 and resistor 70.

The operation of the switching device shown in FIG. 1 can best be explained by assuming at the outset that magnetic core 1 is in the set state. Because of the interconnection between the set and reset windings of magnetic cores 1 and 14, magnetic core 14 must then be in the blocked state. Accordingly, a potential is present across resistor 29 and not present across resistor 53 and transistors 32 and 40 are conductive while transistors 45 and 50 are nonconductive. Since a potential is present across resistor 29, the base of transistor 54 is biased with +4.5 volts, and since no potential is present across resistor 53, the base of transistor 55 is biased with +1.5 volts. If switch 62 is closed momentarily, capacitors 63 and 66 are charged, placing a potential of somewhere between −1.5 and −4.5 volts on the bases of transistors 54 and 55. This potential overcomes the bias on transistor 55, renders it conductive and current therefore flows through set winding 24, changing magnetic core 14 to the set state, and through reset winding 11, changing magnetic core 1 to the blocked state. The cores have both changed states and therefore transistors 32 and 40 are nonconductive, transistors 45 and 50 are conductive, +4.5 volts bias is applied to the base of transistor 55 and +1.5 volts bias is applied to the base of transistor 54. The next closure of switch 62 renders transistor 54 conductive instead of transistor 55 and brings about a similar reversal of conditions, returning the apparatus to its initial operative state. Each subsequent closure of switch 62 is effective to again reverse conditions. It is apparent, therefore, that successive pulses, or closures of the switch 62, cause transistors 32, 40, 45 and 50 to change conditions in accordance with a progression of the binary type. The discharge time constant of condensers 30 and 52 and their associated resistors 29 and 53 respectively, must be great enough to maintain the 3 volt reverse bias on the base of their associated transistors 54, 55 until the incoming control pulse provided by switch 62 has ceased. Otherwise, near the end of the pulses duration, after the selected transfluxor has switched off, the pulse voltage may appear at the input of the "off" transistor, and cause it to turn back on spuriously.

Figure 2:
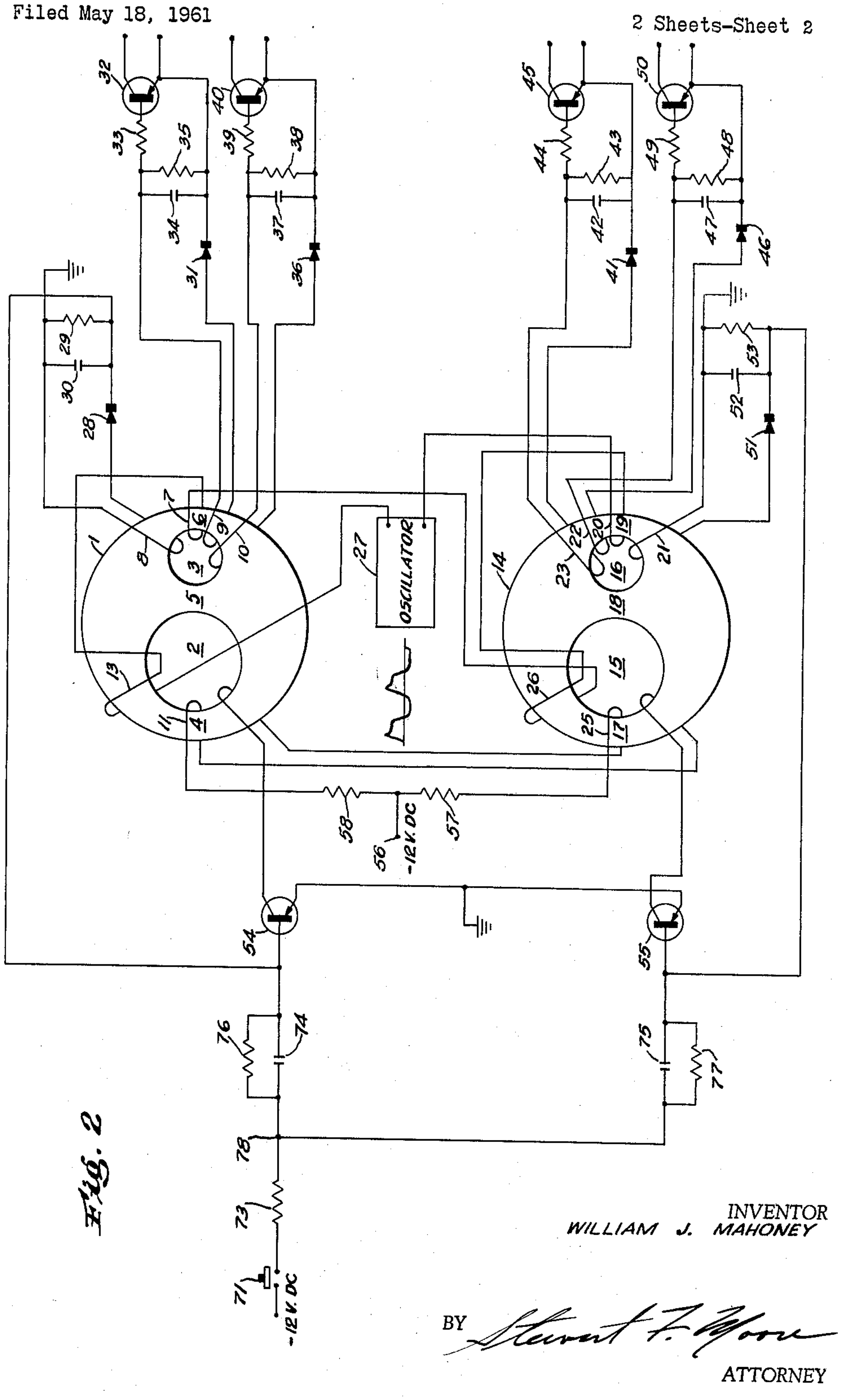
FIG. 2 is a schematic diagram of a binary switching apparatus according to a second embodiment of the present invention.

A schematic diagram of apparatus according to a second embodiment of this invention is shown in FIG. 2. Except for the method of applying pulses and bias to the bases of control transistors 54 and 55, the components shown in this embodiment operate essentially the same as those described in connection with FIG. 1. More specifically, magnetic core 1 and magnetic core 14 have windings disposed relative to the cores operative in the same manner; transistors 54 and 55 are connected to the respective set and reset windings to change the state of their respective core in the same manner; output circuits including transistors 32, 40, 45 and 50 are essentially the same; when magnetic core 1 is in the set state, a potential is developed across resistor 29 in the same manner; and when magnetic core 14 is in the set state, a potential is developed across resistor 53 in the same manner as in the apparatus of FIG. 1.

The potential developed across resistor 29 when magnetic core 1 is in the set state is approximately 3 volts and is applied to bias transistor 54 to its "off" condition. When magnetic core 1 is in the blocked state there is no potential develop across resistor 29 and therefore no reverse bias potential is applied to the base of transistor 54. Similarly, when magnetic core 14 is in the set state, a potential of approximately 3 volts is developed across resistor 53 and is applied as reverse bias to the base of resistor 55. When magnetic core 14 is in the blocked state there is no bias potential applied to the base of transistor 55.

Input pulses developed by successive closures of switch 71 are applied to the base of transistor 54 by passing through the series circuit consisting of resistor 73 and capacitor 75. Resistors 76 and 77 are connected in parallel respectively with capacitors 74 and 75 and provide a discharge path.

Assume that magnetic core 1 is in the set state and that magnetic core 14 is in the blocked state. Accordingly, transistors 32 and 40 are conductive and a potential is developed across resistor 29, biasing the base of transistor 54 with a positive 3 volts. Also, transistor 45 and 50 are not conducting and resistor 53 has no potential developed across it and therefore no bias potential is applied to transistor 55. Under these circumstances, if switch 71 closes, capacitors 74 and 75 begin to charge, developing a negative potential on the bases of transistors 54 and 55. Since transistor 54 is biased with +3-volts potential, it does not immediately become conductive. Transistor 55, however, has no bias potential and therefore immediately becomes conductive, thus greatly reducing the emitter-to-base resistance. When transistor 55 becomes conductive, the potential drop between the emitter and base becomes approximately .2 volt. Since the resistance of capacitor 75 is negligible at this time of initially high charging current, and the resistance value of resistor 77 is high, virtually all of the remainder, i.e., 11.80 volts, must be developed across resistor 73. Accordingly, the potential at junction 78 becomes approximately −.2 volt, and, hence, the potential on the base of transistor 54 can never exceed −.2 volt. Therefore, transistor 54 remains nonconductive since the +3 volts bias can never be exceeded by the base potential. The pulse applied by closing switch 71 renders transistor 55 conductive, permitting current flow through set winding 24 and reset winding 11, thus changing the state of both cores.

Once the change has taken place, transistor 55 becomes biased with the +3 volts and transistor 54 has no bias applied to it. Accordingly, the next pulse developed by the closing of switch 71 renders transistor 54 conductive and the state of magnetic cores 1 and 14 is again reversed. Each successive pulse developed again changes the state of the magnetic cores.

While pulses are produced by the closing of switches, such as switch 62 in FIG. 1 and switch 71 in FIG. 2, switch hash will be present in the pulses. For example, when the switch is being closed, an arc between the contacts may produce a spurious pulse which precedes the main pulse, and which may be sufficient to trigger the circuit. The effect of spurious pulses or switch hash can be eliminated by designing sufficient time delay into the circuits in FIG. 1, which include capacitors 30, 52, 63 and 66, and in FIG. 2, which include capacitors 30, 52, 74 and 75. Time delay of these circuits can be increased by increasing the size of capacitors 30 and 52, the back resistance of diodes 64 and 67, the resistance of resistors 69, 70, 76 and 77.

While two particularly advantageous embodiments of the invention have been chosen for illustration, it will be obvious to those skilled in the art that numerous changes may be made without departing from the scope of the present invention. For example, higher order progressions can easily be obtained by employing a larger number of transfluxors and using an output signal from the transfluxor to inhibit all but one of the control circuits, thus permitting a pulse applied simultaneously to all control circuits to change a desired transfluxor to the set condition. Also, the present invention is not limited to primary switching devices of the transfluxor type, since any equivalent device producing an output signal when "on" and no output signal when "off" can be used. The present invention is pointed out more specifiically in the appended claims.

What is claimed is:

1. In an electrical apparatus of the type described, the combination of a plurality of electrical devices each having an "on" condition and an "off" condition and operative to provide an output electrical quantity when in "on" condition; circuit means interconnecting said electrical devices in such maner that said electrical devices can be rendered "on" via said circuit means only one at a time; a plurality of control devices each connected to one of said electrical devices and operable to render "on" the electrical device to which it is connected, each of said control devices being connected to receive the output electrical quantity from at least one of said electrical devices other than that to which it is connected and being inhibited, so as not to be operative to render the corresponding electrical device "on," while such output electrical quantity is received.

2. In an electrical apparatus of the type described, the combination of a first and a second electrical device each having an "on" state and an "off" state and operative to produce an output electrical quantity when in its "on" state, said electrical devices being interconnected in such fashion that when one thereof is "on" the other is "off"; first and second control devices connected respectively to said electrical devices and each operative when actuated to change the state of the one of said electrical devices to which it is connected; first circuit means connected to said first electrical device to receive the output electrical quantity therefrom, said first circuit means being connected to one of said control devices to inhibit the same upon occurrence of such output electrical quantity; and second circuit means connected to said second electrical device to receive the output electrical quantity therefrom, said second circuit means being connected to the other of said control devices to inhibit the same upon occurrence of such output electrical quantity.

3. In an electrical apparatus, the combination of a first and a second transfluxor each comprising a multi-apertured core of magnetic material and a primary winding, a secondary winding and at least one control winding operatively associated with said core, said transfluxors each having a set state in which application of pulses to the primary winding causes pulses to be induced in the secondary winding, and a blocked state, said transfluxors being so electrically interconnected that when one is in the set state producing an electrical output quantity in its secondary winding the other is in the blocked state, whereby only one of said electrical windings at a time is operative to produce an output electrical quantity; electrical means for producing control pulses; control means connected to the control windings of said transfluxors and to said electrical means to receive control pulses therefrom, said control means being operative upon receiving a control pulse from said electrical means, to place in the set state the one of the transfluxors which is then in the blocked state; and circuit means connecting said control means to at least one of said secondary windings to receive the output electrical quantity therefrom, the presence of an output electrical quantity applied to said control means preventing energization of one of said control windings to insure the energization of the proper control winding to change the state of said transfluxors.

4. In an electrical apparatus of the type described, the combination of a first and a second transfluxor each comprising a multi-apertured core of magnetic material and a primary winding, a secondary winding and at least one control winding operatively associated with said core, said transfluxors each having a set state, in which application of pulses to the primary winding causes pulses to be induced in the secondary winding, and a blocked state, said transfluxors being so electrically interconnected that when one is in the set state to produce an output quantity in its secondary winding the other is in the blocked state, whereby only one of said secondary windings at a time is operative to produce an output electrical quantity; electrical means for producing control pulses; first control means connected to said control winding of said first transfluxor and said electrical means to receive control pulses therefrom, said first control means, when activated, being operative to change the state of said first transfluxor upon receiving a control pulse, said first control means being inoperative when said first transfluxor is in the set state; and second control means connected to said control winding of said second transfluxor and said electrical means to receive control pulses therefrom, said second control means, when activated, being operative to change the state of said second transfluxor upon receiving a control pulse, said second means being inoperative when said second transfluxor is in the set state in response to the subsequent input pulse to change the state of that transfluxor.

5. An electrical apparatus in accordance with claim 4, and comprising first and second circuit means respectively connecting said first and second control means to said first and second transfluxors to receive the output electrical quantity therefrom, the presence of an output electrical quantity rendering inoperative the control means receiving the same while not affecting the operation of the other control means.

6. In a device of the type described, the combination of a first and a second transfluxor each comprising a multi-apertured core of magnetic material and a primary winding, a secondary winding, a set winding and a reset winding operatively associated with said core, said transfluxors each having a set state, existing subsequent to energization of the set winding, in which application of pulses to the primary winding causes pulses to be induced in the secondary winding to produce an output electrical quantity, and a blocked state, existing subsequent to energization of the reset winding, in which no substantial pulses can be induced in the secondary winding; electrical means for producing control pulses; first control means connected to said set winding of said first transfluxor, said reset winding of said second transfluxor and said electrical means to receive control pulses therefrom; and second control means connected to said remaining set and reset windings and said electrical means to receive control pulses therefrom; said first and second control means being operative to energize said set and reset windings connected thereto upon receiving a control pulse, said first and second control means being inoperative respectively when said first and second transfluxors are in the set state, the interconnection between the set and reset windings being such as to cause a complete reversal of circuit conditions on each subsequent input pulse.

7. An electrical apparatus in accordance with claim 6, and comprising first and second circuit means respectively connecting said first and second control means to said first and second transfluxors to receive the output electrical quantity therefrom, the presence of an output electrical quantity rendering inoperative the control means receiving the same both for a fully set and a partially set condition.

8. An electrical apparatus in accordance with claim 7, and wherein each of said transfluxors includes an additional winding connected in series with said primary winding, energization of said primary and additional windings by an asynchronous signal preventing any state other than the set state and the blocked state from persisting in the transfluxor comprising the windings so energized.

9. In a device of the type described, the combination of a first and a second transfluxor each comprising a multi-apertured core of magnetic material and a primary winding, a secondary winding, a set winding and a reset winding operatively associated with said core, said transfluxors each having a set state, existing subsequent to energization of the set winding, in which application of pulses to the primary winding causes pulses to be induced in the secondary winding to produce an output electrical quantity, and a blocked state, existing subsequent to energization of the reset winding, in which no substantial pulses can be induced in the secondary winding; electrical means for producing control pulses; a first transistor connected to said set winding of said first transfluxor, said reset winding of said second transfluxor and to said electrical means to receive control pulses therefrom, a second transistor connected to said remaining set and reset winding and to said electrical means to receive control pulses therefrom, said first and said second transistor being normally non-conducting in the quiescent state, first and second circuit means respectively connecting said first and second transistors to said first and second transfluxors to receive the output electrical quantity therefrom and to selectively bias one of said transistors to inoperative state, the operative one of said transistors becoming conductive upon receiving a control pulse, permitting current flow through the set and reset windings connected thereto, and thereby changing the state of said transfluxors.

10. An electrical apparatus in accordance with claim 9, and wherein each of said transfluxors includes an additional winding connected in series with said primary winding, energization of said primary and additional windings by an asynchronous signal preventing any state other than the set state and the blocked state from persisting in the transfluxor comprising the windings so energized.

11. The invention defined in claim 10 including an impedance connected between said electrical circuit means and said transistors to pass current when the unbiased one of said transistors is rendered conductive by a control pulse supplied by said electrical circuit means, the potential drop developed across said impedance during such current flow preventing the same control pulse from providing a potential sufficient to overcome the bias on the other of said transistors.

References Cited by the Examiner

UNITED STATES PATENTS

| | | | |
|---|---|---|---|
| 2,802,953 | 8/1957 | Arsenault | 340—174 |
| 2,911,630 | 11/1959 | Dinowitz | 340—174 |
| 2,995,735 | 8/1961 | Frank | 307—88 X |
| 3,036,221 | 5/1962 | Kleinschmidt | 307—88 |
| 3,044,044 | 7/1962 | Lee | 340—174 |
| 3,047,737 | 7/1962 | Kolodin | 307—88.5 |

IRVING L. SRAGOW, *Primary Examiner.*